Figure 3:
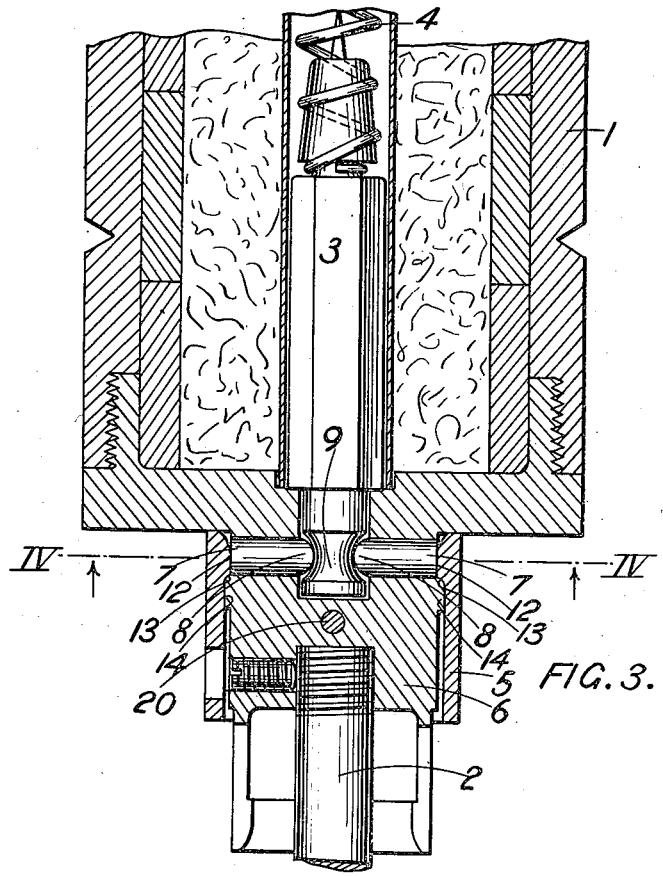
Figure 4:
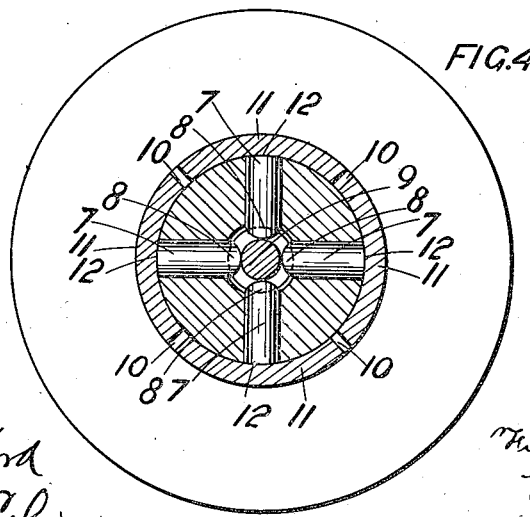

F. M. HALE.
PROJECTILE.
APPLICATION FILED NOV. 24, 1911.
1,121,091.
Patented Dec. 15, 1914.
6 SHEETS—SHEET 1.
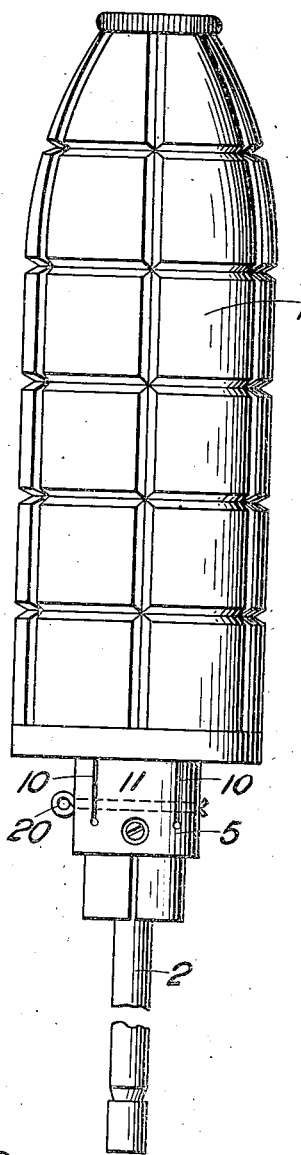
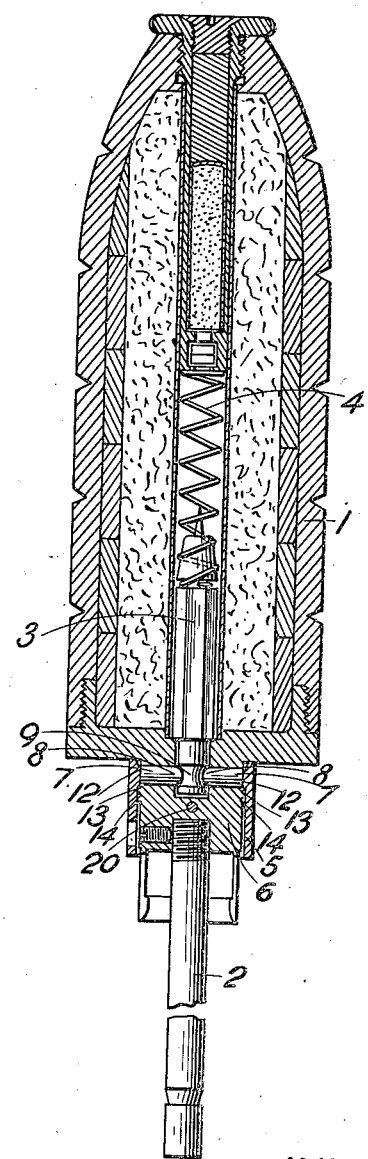

F. M. HALE.
PROJECTILE.
APPLICATION FILED NOV. 24, 1911.

1,121,091.

Patented Dec. 15, 1914.
6 SHEETS—SHEET 2.

WITNESSES.
M. G. Crawford
James K. Cole

INVENTOR.
Frederick Martin Hale
By A. Parker Smith
Attorney

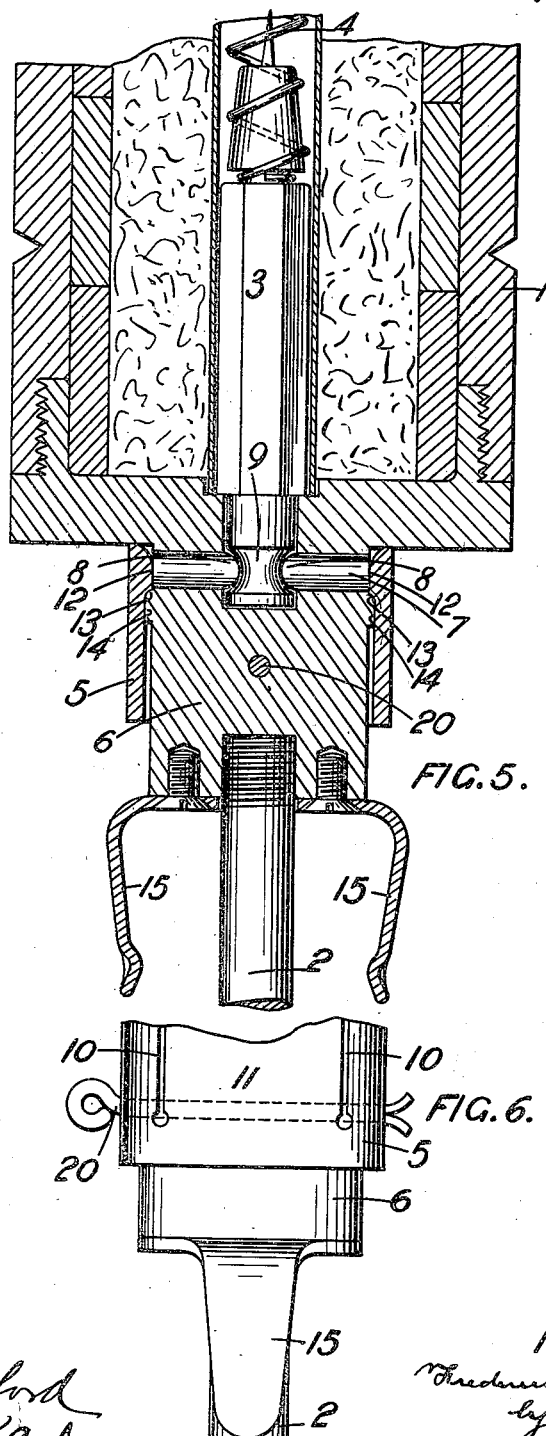

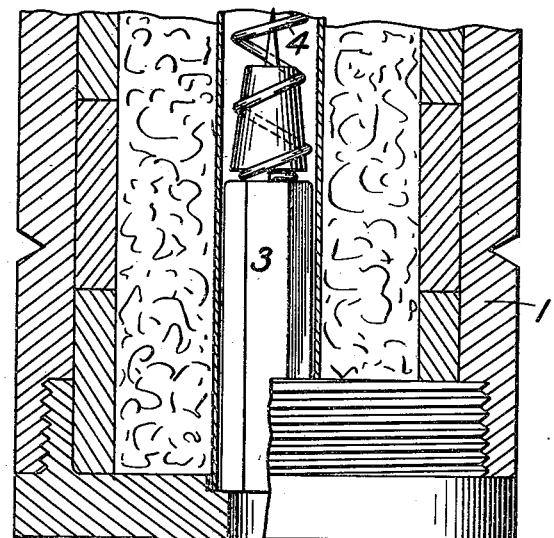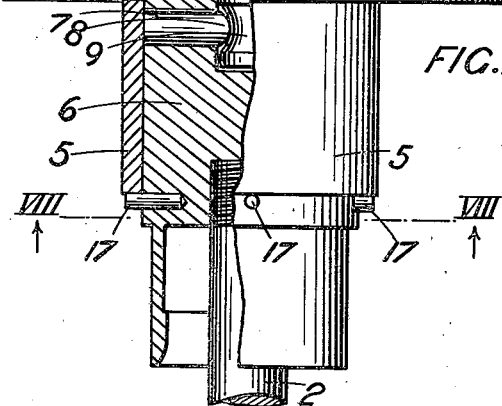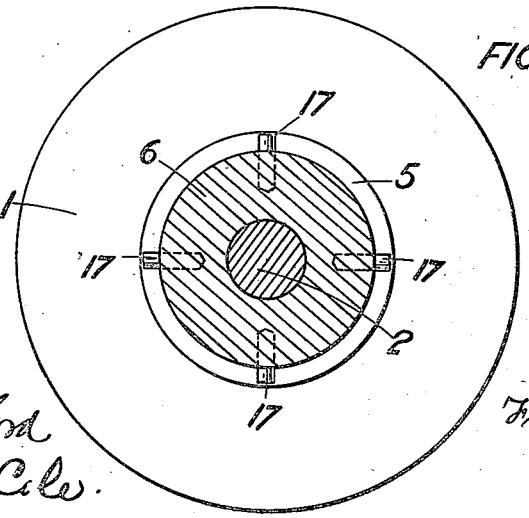

F. M. HALE.
PROJECTILE.
APPLICATION FILED NOV. 24, 1911.
1,121,091.
Patented Dec. 15, 1914.
6 SHEETS—SHEET 5.
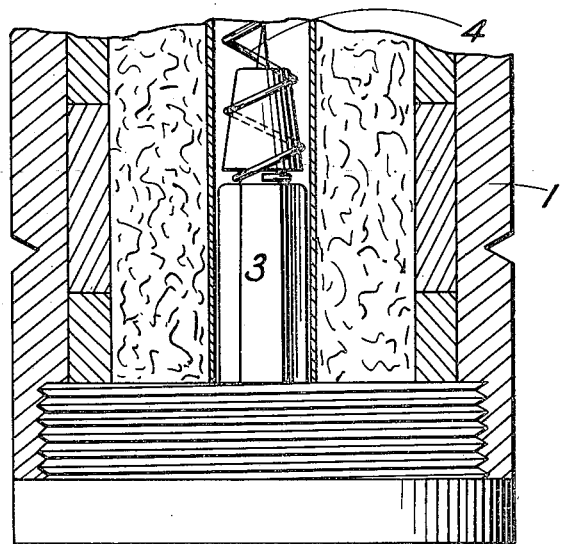
FIG. 9.
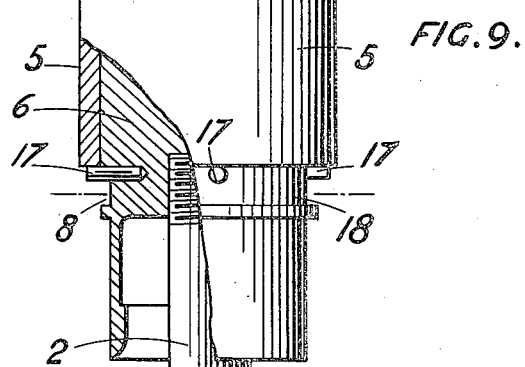
FIG. 10.
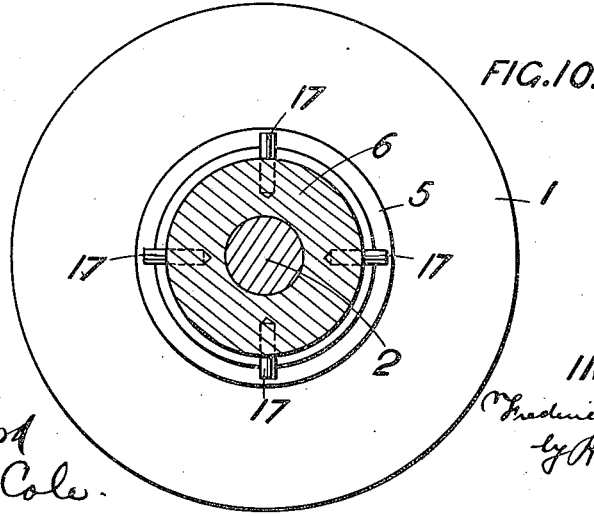
WITNESSES.
M. G. Crawford
James K. Cole.
INVENTOR.
Frederick Martin Hale
by A Parker Smith
Attorney F. M. HALE.
PROJECTILE.
APPLICATION FILED NOV. 24, 1911.
1,121,091.
Patented Dec. 15, 1914.
6 SHEETS—SHEET 6.
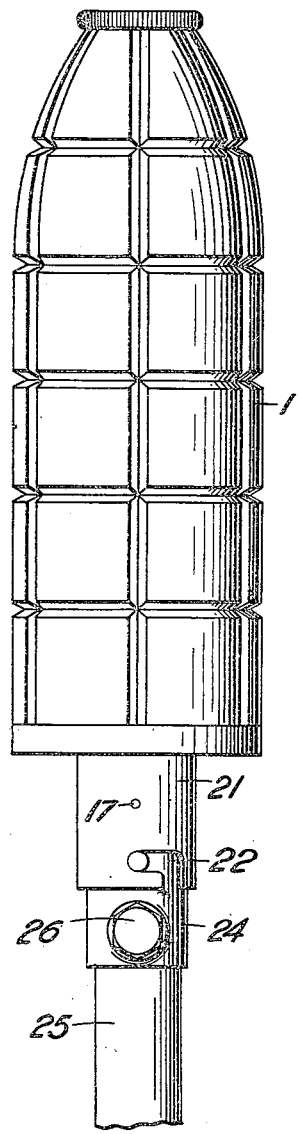
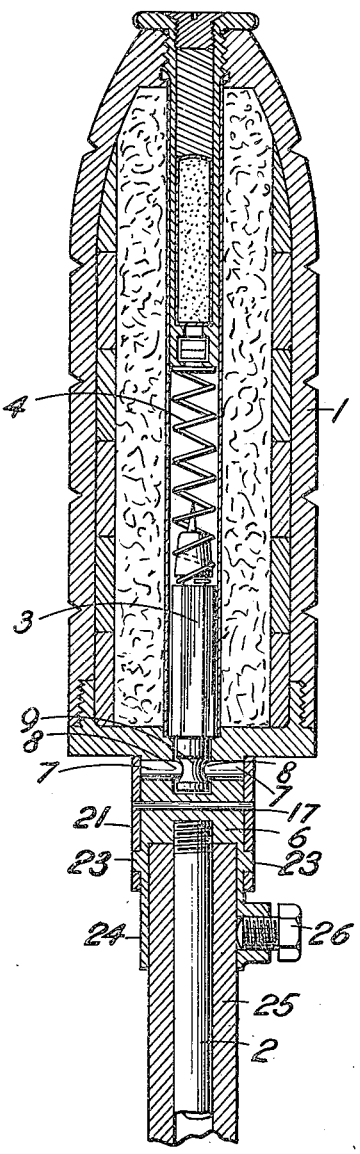
WITNESSES.
M. G. Crawford
James K. Cole
INVENTOR.
Frederick Marten Hale
by A Parker Smith
Attorney

UNITED STATES PATENT OFFICE.

FREDERICK MARTEN HALE, OF CATFORD, LONDON, ENGLAND.

PROJECTILE.

1,121,091.      Specification of Letters Patent.      Patented Dec. 15, 1914.

Application filed November 24, 1911. Serial No. 662,174.

*To all whom it may concern:*

Be it known that I, FREDERICK MARTEN HALE, engineer, a subject of the King of Great Britain and Ireland, and a resident of Hillsborough, 28 Woolstone road, Catford, in the county of London, England, have invented certain new and useful Improvements in and Pertaining to Projectiles, of which the following is a specification.

This invention relates to projectiles such as are described in the specification of British Letters Patent granted to me and numbered 15045 of 1908—*i. e.*, projectiles of the type in which the body of the projectile is of greater diameter than the bore of the small arm or gun (hereinafter referred to as the gun) with which it is to be used and is provided with a rod adapted to extend into the barrel of the said small arm or gun. In such a projectile as heretofore usually constructed a spring has been provided which has been intended to fulfil two purposes—viz., (1) to prevent the striker from creeping forward during the flight of the projectile and so coming into contact or proximity with the percussion device and thus preventing the operation of the percussion device by means of the striker by the impact of the projectile upon the object struck, and (2) to prevent the projectile from being exploded should it accidentally fall from a height of say five to six feet.

To fulfil the second of the above mentioned purposes, the spring has, according to my experience, had to be so strong that it has been liable to prevent the projectile from being exploded if the force of impact were comparatively small, as, for example, if the projectile simply grazed the object or if it struck water, loose earth, or soft mud. Now this invention has for object to obviate this disadvantage. By means thereof a projectile such as described may be adapted to be exploded by any minimum force of impact that is likely to be met with in actual warfare. With such sensitiveness in regard to explosion, it may be expected that the whole of the explosion will take place immediately on impact, and therefore about and around the point of impact and before the projectile will have had time to make a cavity or embed itself in the earth, and consequently that the greatest possible effect of the whole of the shrapnel action of the projectile will be obtained, notwithstanding the great security provided against the accidental explosion of the projectile even in the case of careless handling such as would be likely to occur in warfare.

A projectile has been constructed according to this invention in which the spring was sufficiently strong to prevent the creeping forward of the striker during the flight so as to fulfil the first of the conditions hereinbefore mentioned but was yet so delicate as to allow explosion to be produced by a drop of two inches.

According to this invention the projectile is provided with a device—it may be a weight—which before the discharge of the projectile is so engaged therewith as to be liberated or disengaged therefrom by the shock of discharge and before liberation or disengagement is so connected with the striker as to prevent any forward movement of the striker—for example, should the projectile be accidentally dropped from a height such as aforesaid—while the device is adapted—it may be by the inertia of its mass—to be caused to lag in relation to or remain behind the projectile and so become disengaged from the striker immediately after the projectile has begun to move away from the gun; instead of making the device of such a mass as to give it sufficient inertia to produce the disengagement from the striker I sometimes connect the device to the gun so that it will remain connected thereto after the discharge of the projectile therefrom.

According to one construction, the device or weight is annular and fits on the rear portion of the body of the projectile and in that position holds in place a pin or pins which, or each of which, engages with the striker in such a manner that when the device or weight is in the position of engagement the striker is held back, while if the pin or pins be disengaged by the device or weight it, or they, will offer no appreciable resistance to the forward movement of the striker. The pin or pins is or are or may be arranged radially and it or each of them has or may have a rounded inner end engaging in an annular groove in the striker having an inclined rear surface so as to facilitate the pushing aside of the pin or pins by the striker on the impact of the projectile should it or any of them not have fallen away during the flight of the projectile.

Any suitable means may be provided for connecting the device or weight to the projectile so as to hold it in position thereon prior to the discharge of the projectile but to cause it to be liberated or disengaged therefrom by the shock of discharge. For this purpose there may be secured to the projectile one or more pins adapted to engage with the weight and so hold it in position but adapted to be sheared or bent away by the inertia of the weight or the engagement of the device with the small arm or gun so as to allow it to lag in relation to or remain behind the projectile and so become disengaged from the striker. In some cases the weight or device may afterward fall off and away from the projectile but in other cases it may be carried along by the projectile or it may remain secured to the small arm or gun.

Instead of employing a pin or pins adapted to be sheared or bent as described above, I sometimes connect the device or weight by a clip or catch device or adapt it to engage with the projectile by spring or frictional action, the engagement in any case being such as to be overcome by the shock of discharge but in normal conditions to hold the device or weight in its operative position on the projectile prior to the discharge thereof.

The various features of the invention are set forth in the claims appended hereto and the invention is illustrated by the accompanying drawings which represent various examples of projectiles provided with striker engaging and liberating or disengaging means according thereto.

Figures 1, 2, 3, and 4 are respectively a longitudinal section, an elevation taken at right angles to Fig. 1, a partial longitudinal section drawn to a larger scale than Fig. 1, a cross section corresponding to the line IV of Fig. 3, of one example of a projectile provided with means according to this invention. Figs. 5 and 6 are respectively a partial longitudinal section and a partial elevation taken at right angles to each other of another example. Figs. 7 and 8 represent a third example partly in longitudinal section and in cross section corresponding to the line VIII of Fig. 7. Figs. 9 and 10 are views corresponding respectively to Figs. 7 and 8 of a fourth example. Figs. 11 and 12 are respectively an elevation and a longitudinal section taken at right angles to each other of a fifth example.

In each case 1 is the body of the projectile, 2 the rod adapted to extend into the barrel of the gun, 3 the striker, and 4 the spring for preventing the striker from creeping forward during the flight of the projectile.

In each of the examples represented in Figs. 1 to 5 inclusive 5 is a weight which, before the discharge of the projectile from the gun, is so engaged with the projectile as to be liberated by the shock of discharge and before liberation is so connected with the striker as to prevent any forward movement thereof, and which has such inertia as to cause it to lag in relation to the projectile and so become disengaged from the striker immediately after the projectile has begun to move away from the gun.

In each of the examples shown in Figs. 1 to 10 inclusive the weight 5 is annular and fits on the rear portion 6 of the body of the projectile and in that position holds in place radial pins 7 each of which has a rounded inner end 8 engaging in an annular groove 9 which is formed in the striker 3 and the rear surface at least of which is inclined so as to facilitate the pushing aside of the pins or pin by the striker on the impact of the projectile should they, or any of them, not have fallen away during the flight of the projectile.

Various means are shown in the drawings for connecting the weight to the projectile so as to hold it in position prior to the discharge of the projectile but to cause it to be liberated therefrom by the shock of discharge. In the example shown in Figs. 1 to 4 inclusive for this purpose the weight 5 comprises a catch device, the weight being partially split, as shown at 10 in Fig. 2 so as to form a number of catches 11, each of which has a radially inwardly projecting portion 12 adapted to engage with the forward edge 13 (which is rounded) of an annular projection 14 of the rear portion 6 of the body of the projectile, the engagement being such as to be overcome by the shock of discharge owing to the rounding of the edge 13 but in normal conditions to hold the weight in its operative position on the projectile prior to the discharge thereof.

The example shown in Figs. 5 and 6 is suitable for use with a British short service rifle—i. e., a rifle in which the barrel does not project beyond the stock so as to be adapted to be engaged by the clutch of the projectile. In this case the fingers 15 of the clutch of the projectile extend radially outward too far to enable them, and consequently the rod 2, to pass through the weight 5 and thus allow the weight 5 to fall off and away from the projectile. To prevent the weight 5, after passing rearwardly along the rear portion 6 of the body of the projectile and being stopped by the fingers 15, from creeping forward during the flight of the projectile and so again engaging the pins 7, the weight 5 is made of such a length as to enable the radially inwardly projecting portion 12 and the catches 11 to engage behind the annular projecting portion 14 of the rear portion 6 of the body of the projectile.

In the example shown in Figs. 7 and 8 the projectile has secured to it pins 17 adapted to engage with the weight 5 and so hold it in position but to be sheared by the inertia of the weight on the shock of discharge.

In the example shown in Figs. 9 and 10 the pins 17 are adapted to be bent away by the inertia of the weight on the shock of discharge, the body portion 6 of the projectile being recessed at 18 so as to allow the bending back of the pins.

In each of the examples shown in Figs. 1 to 6 inclusive 20 is a split pin which is normally in the position shown but is withdrawn when it is intended to fire the projectile.

Experiment has shown that a weight 5 such as shown in the drawings and that will not be allowed by its catch device 12, 13 or pins 17 to become disengaged from the pins 7 when the projectile is dropped through a distance of even twelve feet, will readily become disengaged therefrom when the projectile is fired from a rifle with a service cartridge such as is ordinarily used with such a rifle.

Figs. 11 and 12 illustrate the construction according to which the device for engaging the striker and disengaging it on the shock of discharge is connected to the small arm or gun so that it will remain connected thereto after the discharge of the projectile therefrom. In the example shown the device is a ring 21 which engages by means of bayonet slots 22 with pins 23 projecting from a collar 24 which is attached to the barrel 25 of the small arm or gun by means of a screw 26. As in the case of the annular weight 5 shown in Figs. 1 to 4, the ring 21 fits on the rear portion 6 of the projectile and in that position holds in place radial pins 7 each of which has a rounded inner end 8 engaging in an annular groove 9 which is formed in the striker 3 and the rear surface at least of which is inclined so as to facilitate the pushing aside of the pins or pin by the striker on the impact of the projectile should they or any of them not have fallen away during the flight of the projectile.

To hold the device 21 normally in position on the projectile so as to engage the pins 7 and thereby lock the striker 3, the device 21 is secured to the projectile by a pin 17, which fits in the rear portion 6 of the body of the projectile and in holes in the device 21 and is adapted to be sheared by the force with which the projectile is driven from the gun. Instead of being secured in this manner, the device 21 might be normally secured in position on the projectile by means such as are provided for the weight 5 shown in Figs. 1 to 10 inclusive.

Although in each of the examples represented the weight 5 or the device 21 is provided either with a spring catch device or with a pin or pins for holding it in position on the projectile prior to the discharge thereof, the weight 5 or the device 21 might be adapted to engage with the projectile by merely frictional action, as by being fitted with just the exact amount of tightness upon the rear portion 6 of the body of the projectile; but as there would be some difficulty in insuring the precise amount of friction in this way I prefer to employ more positive means such as I have shown in the drawings.

What I claim is:—

1. A projectile comprising a body portion, a rod connected to said body portion and adapted to extend into the barrel of a small-arm or gun and less in diameter than said body portion, a fixed firing element located within said body portion, a movable firing element adapted to impinge on said fixed firing element upon forward movement thereof under the action of inertia on impact of the projectile, an engaging member adapted to engage said movable firing element, one of the engaging surfaces of said engaging member and said movable firing element being inclined so as to facilitate the disengagement of said engaging member from said movable firing element by a tendency to forward movement of said movable firing element, and a device arranged externally on a rearwardly projecting portion of said body portion and adapted normally to engage said engaging member and thereby to maintain it in engagement with said movable firing element so as to prevent forward movement thereof but adapted to be caused by the discharge of the projectile from the small-arm or gun to execute a rearward movement relative to said body portion and thereby to assume a position such as to be out of engagement with said engaging member.

2. A projectile comprising a body portion, a rod connected to said body portion and adapted to extend into the barrel of a small-arm or gun and less in diameter than said body portion, a fixed firing element located within said body portion, a movable firing element adapted to impinge on said fixed firing element upon forward movement thereof under the action of inertia on impact of the projectile, an engaging member adapted to engage said movable firing element, one of the engaging surfaces of said engaging member and said movable firing element being inclined so as to facilitate the disengagement of said engaging member from said movable firing element by a tendency to forward movement of said movable firing element, a device arranged externally on a rearwardly projecting portion of said body portion and adapted normally to engage said engaging member and thereby to maintain it in engagement with said movable firing element so as to prevent forward movement thereof but adapted to be caused by the discharge of the projectile from the small-arm or gun to execute a rearward movement relative to said body portion and thereby to assume a position such as to be out of engagement with said engaging member, and means adapted to maintain said device normally in engagement with said engaging member but to permit said device to have said relative movement produced by the discharge of the projectile from the small-arm or gun.

3. A projectile comprising a body portion, a rod connected to said body portion and adapted to extend into the barrel of a small-arm or gun and less in diameter than said body portion, a fixed firing element located within said body portion, a movable firing element adapted to impinge on said fixed firing element upon forward movement thereof under the action of inertia on impact of the projectile, an engaging member adapted to engage said movable firing element, one of the engaging surfaces of said engaging member and said movable firing element being inclined so as to facilitate the disengagement of said engaging member from said movable firing element by a tendency to forward movement of said movable firing element, and a device arranged externally on a rearwardly projecting portion of said body portion and adapted normally to engage said engaging member and thereby to maintain it in engagement with said movable firing element so as to prevent forward movement thereof but adapted to be caused by the discharge of the projectile from the small-arm or gun owing to its inertia to execute a rearward movement relative to said body portion and thereby to assume a position such as to be out of engagement with said engaging member.

4. A projectile comprising a body portion, a rod connected to said body portion and adapted to extend into the barrel of a small-arm or gun and less in diameter than said body portion, a fixed firing element located within said body portion, a movable firing element adapted to impinge on said fixed firing element upon forward movement thereof under the action of inertia on impact of the projectile, an engaging member adapted to engage said movable firing element, one of the engaging surfaces of said engaging member and said movable firing element being inclined so as to facilitate the disengagement of said engaging member from said movable firing element by a tendency to forward movement of said movable firing element, a device arranged externally on a rearwardly projecting portion of said body portion and adapted normally to engage said engaging member and thereby to maintain it in engagement with said movable firing element so as to prevent forward movement thereof but adapted to be caused by the discharge of the projectile from the small-arm or gun owing to its inertia to execute a rearward movement relative to said body portion and thereby to assume a position such as to be out of engagement with said engaging member, and means adapted to maintain said device normally in engagement with said engaging member but to permit said device to have said relative movement produced by the discharge of the projectile from the small-arm or gun.

5. A projectile comprising a body portion, a rod connected to said body portion and adapted to extend into the barrel of a small-arm or gun and less in diameter than said body portion, a fixed firing element located within said body portion, a movable firing element adapted to impinge on said fixed firing element upon forward movement thereof under the action of inertia on impact of the projectile, spring means adapted to prevent said movable firing element from impinging on said fixed firing element during the flight of said projectile, an engaging member adapted to engage said movable firing element, one of the engaging surfaces of said engaging member and said movable firing element being inclined so as to facilitate the disengagement of said engaging member from said movable firing element by a tendency to forward movement of said movable firing element, and a device arranged externally on a rearwardly projecting portion of said body portion and adapted normally to engage said engaging member and thereby to maintain it in engagement with said movable firing element so as to prevent forward movement thereof but adapted to be caused by the discharge of the projectile from the small-arm or gun to execute a rearward movement relative to said body portion and thereby to assume a position such as to be out of engagement with said engaging member.

6. A projectile comprising a body portion, a rod connected to said body portion and adapted to extend into the barrel of a small-arm or gun and less in diameter than said body portion, a fixed firing element located within said body portion, a movable firing element adapted to impinge on said fixed firing element upon forward movement thereof under the action of inertia on impact of the projectile, an engaging member adapted to engage said movable firing element, one of the engaging surfaces of said engaging member and said movable firing element being inclined so as to facilitate the disengagement of said engaging member from said movable firing element by a tendency to forward movement of said movable firing element, and a device adapted to engage said engaging member and thereby to maintain it normally in engagement with said movable firing element so as to prevent forward movement thereof but adapted to be caused by the discharge of the projectile from the small-arm or gun to execute a rearward movement relative to said body portion and thereby to assume a position such as to be out of engagement with said engaging member, said device being in the form of a ring arranged externally on, and adapted to engage resiliently with, a rearwardly projecting portion of said body portion so as normally to engage said engaging member, but to be capable of having said relative rearward movement produced in it by the discharge of the projectile from the small-arm or gun.

7. A projectile comprising a body portion, a rod connected to said body portion and adapted to extend into the barrel of a small-arm or gun and less in diameter than said body portion, a fixed firing element located within said body portion, a movable firing element adapted to impinge on said fixed firing element upon forward movement thereof under the action of inertia on impact of the projectile, an engaging member adapted to engage said movable firing element, one of the engaging surfaces of said engaging member and said movable firing element being inclined so as to facilitate the disengagement of said engaging member from said movable firing element by a tendency to forward movement of said movable firing element, and a device adapted to engage said engaging member and thereby to maintain it normally in engagement with said movable firing element so as to prevent forward movement thereof but adapted to be caused by the discharge of the projectile from the small-arm or gun owing to its inertia to execute a rearward movement relative to said body portion and thereby to assume a position such as to be out of engagement with said engaging member, said device being in the form of a ring arranged externally on, and adapted to engage resiliently with, a rearwardly projecting portion of said body portion so as normally to engage said engaging member, but to be capable of having said relative rearward movement produced in it by the discharge of the projectile from the small-arm or gun.

8. A projectile comprising a body portion, a rod connected to said body portion and adapted to extend into the barrel of a small-arm or gun and less in diameter than said body portion, a fixed firing element located within said body portion, a movable firing element adapted to impinge on said fixed firing element upon forward movement thereof under the action of inertia on impact of the projectile, and a device adapted to prevent forward movement of said movable firing element before the discharge of the projectile from said small-arm or gun, said device comprising a ring arranged externally on, and adapted to engage resiliently with, a rearwardly projecting portion of said body portion so as normally to be retained in a position to prevent said forward movement but adapted to be caused by the discharge of the projectile from the small-arm or gun to execute a rearward movement relative to said body portion and thereby to assume a position in which it will not prevent said forward movement.

9. A projectile comprising a body portion, a rod connected to said body portion and adapted to extend into the barrel of a small-arm or gun and less in diameter than said body portion, a fixed firing element located within said body portion, a movable firing element adapted to impinge on said fixed firing element upon forward movement thereof under the action of inertia on impact of the projectile, and a device adapted to prevent forward movement of said movable firing element before the discharge of the projectile from said small-arm or gun, said device comprising a ring arranged externally on, and adapted to engage resiliently with, a rearwardly projecting portion of said body portion so as normally to be retained in a position to prevent said forward movement but adapted by its inertia to be caused by the discharge of the projectile from the small-arm or gun to execute a rearward movement relative to said body portion and thereby to assume a position in which it will not prevent said forward movement.

10. A projectile comprising a body portion, a rod connected to said body portion and adapted to extend into the barrel of a small-arm or gun and less in diameter than said body portion, a fixed firing element located within said body portion, a movable firing element adapted to impinge on said fixed firing element upon forward movement thereof under the action of inertia on impact of the projectile, and a device adapted to prevent forward movement of said movable firing element before the discharge of the projectile from said small-arm or gun, said device comprising a ring arranged externally on, and adapted to engage resiliently with, a rearwardly projecting portion of said body portion so as normally to be retained in a position to prevent said forward movement but adapted to be caused by the discharge of the projectile from the small-arm or gun to execute a rearward movement relative to said body portion and thereby to assume a position in which it will not prevent said forward movement, and said device comprising also a member adapted prior to said discharge to engage said ring and said movable firing element so as to hold back said movable firing element in its initial position but after said relative rearward movement of said ring to allow forward movement of said movable firing element.

11. A projectile comprising a body portion, a rod connected to said body portion and adapted to extend into the barrel of a small-arm or gun and less in diameter than said body portion, a fixed firing element located within said body portion, a movable firing element adapted to impinge on said fixed firing element upon forward movement thereof under the action of inertia on impact of the projectile, and a device adapted to prevent forward movement of said movable firing element before the discharge of the projectile from said small-arm or gun, said device comprising a ring arranged externally on, and adapted to engage resiliently with, a rearwardly projecting portion of said body portion so as normally to be retained in a position to prevent said forward movement but adapted by its inertia to be caused by the discharge of the projectile from the small-arm or gun to execute a rearward movement relative to said body portion and thereby to assume a position in which it will not prevent said forward movement, and said device comprising also a member adapted prior to said discharge to engage said ring and said movable firing element so as to hold back said movable firing element in its initial position but after said relative rearward movement of said ring to allow forward movement of said movable firing element.

12. A projectile comprising a body portion, a rod connected to said body portion and adapted to extend into the barrel of a small-arm or gun and less in diameter than said body portion, a fixed firing element located within said body portion, a movable firing element adapted to impinge on said fixed firing element upon forward movement thereof under the action of inertia on impact of the projectile, and a device adapted to prevent forward movement of said movable firing element before the discharge of the projectile from said small-arm or gun, said device comprising a ring arranged externally on a rearwardly projecting portion of said body portion and adapted normally to be retained in a position to prevent said forward movement but adapted to be caused by the discharge of the projectile from the small-arm or gun to execute a rearward movement relative to said body portion and thereby to assume a position in which it will not prevent said forward movement.

13. A projectile comprising a body portion, a rod connected to said body portion and adapted to extend into the barrel of a small-arm or gun and less in diameter than said body portion, a fixed firing element located within said body portion, a movable firing element adapted to impinge on said fixed firing element upon forward movement thereof under the action of inertia on impact of the projectile, and a device adapted to prevent forward movement of said movable firing element before the discharge of the projectile from said small-arm or gun, said device comprising a member arranged externally on a rearwardly projecting portion of said body portion and adapted normally to be retained in a position to prevent said forward movement but adapted to be caused by the discharge of the projectile from the small-arm or gun to execute a rearward movement relative to said body portion and thereby to assume a position in which it will not prevent said forward movement.

14. A projectile comprising a body portion, a rod connected to said body portion and adapted to extend into the barrel of a small-arm or gun and less in diameter than said body portion, a fixed firing element located within said body portion, a movable firing element adapted to impinge on said fixed firing element upon forward movement thereof under the action of inertia on impact of the projectile, and a device adapted to prevent forward movement of said movable firing element before the discharge of the projectile from said small-arm or gun, said device comprising a member arranged externally on a rearwardly projecting portion of said body portion and adapted normally to be retained in a position to prevent said forward movement but adapted by its inertia to be caused by the discharge of the projectile from the small-arm or gun to execute a rearward movement relative to said body portion and thereby to assume a position in which it will not prevent said forward movement.

15. A projectile comprising a body portion, a rod connected to said body portion and adapted to extend into the barrel of a small-arm or gun and less in diameter than said body portion, a fixed firing element located within said body portion, a movable firing element adapted to impinge on said fixed firing element upon forward movement thereof under the action of inertia on impact of the projectile, and a device adapted to prevent forward movement of said movable firing element before the discharge of the projectile from said small-arm or gun, said device comprising a member arranged externally on a rearwardly projecting portion of said body portion and adapted normally to be retained in a position to prevent said forward movement but adapted to be caused by the discharge of the projectile from the small-arm or gun to execute a rearward movement relative to said body portion and thereby to assume a position in which it will not prevent said forward movement, and said device comprising also a member adapted prior to said discharge to engage the first mentioned member and said movable firing element so as to hold back said movable firing element in its initial position but after said relative rearward movement of the first mentioned member to allow forward movement of said movable firing element.

16. A projectile comprising a body portion, a rod connected to said body portion and adapted to extend into the barrel of a small-arm or gun and less in diameter than said body portion, a fixed firing element located within said body portion, a movable firing element adapted to impinge on said fixed firing element upon forward movement thereof under the action of inertia on impact of the projectile, and a device adapted to prevent forward movement of said movable firing element before the discharge of the projectile from said small-arm or gun, said device comprising a member arranged externally on a rearwardly projecting portion of said body portion and adapted normally to be retained in a position to prevent said forward movement but adapted by its inertia to be caused by the discharge of the projectile from the small-arm or gun to execute a rearward movement relative to said body portion and thereby to assume a position in which it will not prevent said forward movement; and said device comprising also a member adapted prior to said discharge to engage the first mentioned member and said movable firing element so as to hold back said movable firing element in its initial position but after said relative rearward movement of the first mentioned member to allow forward movement of said movable firing element.

17. A projectile comprising a body portion, a rod connected to said body portion and adapted to extend into the barrel of a small-arm or gun and less in diameter than said body portion, a fixed firing element located within said body portion, a movable firing element adapted to impinge on said fixed firing element upon forward movement thereof under the action of inertia on impact of the projectile, an engaging member adapted to engage said movable firing element, one of the engaging surfaces of said engaging member and said movable firing element being inclined so as to facilitate the disengagement of said engaging member from said movable firing element by a tendency to forward movement of said movable firing element, and a device arranged externally on, and adapted to engage resiliently with, a rearwardly projecting portion of said body portion and adapted normally to engage said engaging member and thereby to maintain it in engagement with said movable firing element so as to prevent forward movement thereof but adapted to be caused by the discharge of the projectile from the small-arm or gun to execute a rearward movement relative to said body portion and thereby to assume a position such as to be out of engagement with said engaging member.

Signed at London this 13th day of November 1911.

FREDERICK MARTEN HALE.

Witnesses:
    WILLIAM OSWALD BROWN,
    FREDERICK LEONARD HUTCHINGS.